US012636621B2

(12) United States Patent
Chui et al.

(10) Patent No.: US 12,636,621 B2
(45) Date of Patent: May 26, 2026

(54) FILTRATION MEMBRANE

(71) Applicant: The Regents of the University of California, Oakland, CA (US)

(72) Inventors: Benjamin W. Chui, Sunnyvale, CA (US); Shuvo Roy, San Francisco, CA (US); Nathan Wright, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 590 days.

(21) Appl. No.: 18/020,031

(22) PCT Filed: Aug. 5, 2021

(86) PCT No.: PCT/US2021/044784
§ 371 (c)(1),
(2) Date: Feb. 6, 2023

(87) PCT Pub. No.: WO2022/031993
PCT Pub. Date: Feb. 10, 2022

(65) Prior Publication Data
US 2023/0277987 A1      Sep. 7, 2023

Related U.S. Application Data

(60) Provisional application No. 63/070,999, filed on Aug. 27, 2020, provisional application No. 63/063,038, filed on Aug. 7, 2020.

(51) Int. Cl.
*B01D 69/10*        (2006.01)
*B01D 71/02*        (2006.01)
(52) U.S. Cl.
CPC ......... *B01D 69/10* (2013.01); *B01D 71/0213* (2022.08); *B01D 71/0215* (2022.08); *B01D 2325/021* (2013.01); *B01D 2325/08* (2013.01)

(58) Field of Classification Search
None
See application file for complete search history.

(56) References Cited

U.S. PATENT DOCUMENTS

| | | | | |
|---|---|---|---|---|
| 5,753,014 | A * | 5/1998 | Van Rijn .............. | B01D 69/108 |
| | | | | 96/13 |
| 2003/0168396 | A1* | 9/2003 | Jacobson ........... | B01D 67/0058 |
| | | | | 210/321.75 |

(Continued)

FOREIGN PATENT DOCUMENTS

| | | |
|---|---|---|
| WO | 2019222661 | 11/2019 |

OTHER PUBLICATIONS

Chui et al., (2020) "A Scalable, Hierarchical Rib Design for Larger-Area, Higher-Porosity Nanoporous Membranes for the Implantable Bio-Artificial Kidney," Journal of Microelectromechanical Systems, IEEE Service Center, vol. 29, No. 5, Oct. 5, 2020, pp. 762-768.

(Continued)

*Primary Examiner* — Hayden Brewster
(74) *Attorney, Agent, or Firm* — Edward J. Baba; Kyuoke Lim; Bozicevic, Field & Francis LLP

(57)        ABSTRACT

The present disclosure provides an improved filtration membrane suitable for filtration of blood in vivo. The improved filtration membrane is resistant to breakage with minimal areal penalty due to presence of a system of supports on the backside of the membrane. The minimal areal penalty is achieved by using supports that provide a hierarchical scaffolding that comprises ribs of two different heights as disclosed herein.

16 Claims, 8 Drawing Sheets

(56)     References Cited

U.S. PATENT DOCUMENTS

| | | | |
|---|---|---|---|
| 2005/0003146 A1 | 1/2005 | Spath | |
| 2005/0263452 A1* | 12/2005 | Jacobson | B01D 67/0034 |
| | | | 264/494 |

OTHER PUBLICATIONS

Chui et al., (2018) "Ribbed Nanoporous Membranes for the Implantable Bio-artificial Kidney." Hilton Head Solid-state Sensor & Actuator Workshop, 2018, S.C., USA.

Desai et al., (2000) "Nanoporous antifouling silicon membranes for bio-sensor applications." Biosensors and Bioelectronics, vo. 15, pp. 453-462.

Drake et al., (2000) "A Micromachined Torsional Mirror for Track Following in Magneto-Optical Disk Drives." Solid-State Sensors and Actuators Workshop, pp. 10-13.

Fissell et al., (2009) "The implantable artificial kidney." Semin. Dial., vol. 22, pp. 665-670.

Gura et al., (2009) "Technical breakthroughs in the wearable artificial kidney (WAK)." Clin. J. Am. Soc. Nephrol., vol. 4, pp. 1441-1448.

Haji-Hassan et al., (2011) "Ultra-thin porous silicon membranes fabricated using dry etching." Micro & Nano Lett., vol. 6, pp. 226-228.

Iamzah et al., (2013) "Electrochemically deposited and etched membranes with precisely sized micropores for biological fluids microfiltration." J. Micromech Microeng., vol. 23, 074007.

Hoogerwerf et al., (2007) "Fabrication of Reinforced Nanoporous Membranes." Proc. Transducers, Lyon, France.

Humes et al., (1999) "Replacement of renal function in uremic animals with a tissue-engineered kidney." Nat. Biotechnol., vol. 17, pp. 451-455.

Humes et al., (2003) "Cell therapy with a tissue-engineered kidney reduces the multiple-organ consequences of septic shock." Crit. Care Med., vol. 31, pp. 2421-2428.

Jager et al., (2009) "Cardiovascular and noncardiovascular mortality among patients starting dialysis." JAMA 302, pp. 1782-1789.

Kim et al., (2016) "Diffusive Silicon Nanopore Membranes for Hemodialysis Applications." PLOS ONE, 20 pages.

Kopple, (2013) "Physical performance and all-cause mortality in Ckd." J. Am. Soc. Nephrol., vol. 24, pp. 689-690.

Lee et al., (2008) "A peritoneal-based automated wearable artificial kidney." Clin. Exp. Nephrol., vol. 12, pp. 171-180.

Utzenberger et al., (2009) "Fabrication and modeling of rib-stiffened thin films." J. Micromech. Microeng., vol. 19.

O'Lone et al., (2016) "Cognition in People with end-stage kidney disease treated with hemodialysis: A systematic review and meta-analysis." Am. J. Kidney Dis. Off. J. Natl. Kidney Found., vol. 67, pp. 925-935.

Ross et al., (2009) "Embryonic stem cells proliferate and differentiate when seeded into kidney scaffolds." J. Am. Soc. Nephrol., vol. 20, pp. 2338-2347.

Roy et al., (2009) "Silicon Nanopore Membrane Technology for an Implantable Artificial Kidney." Proc. Transducers 2009, Denver, CO, USA, 2009.

Salani et al., (2018) "Innovations in Wearable and Implantable Artificial Kidneys." Am. J. Kidney Dis. Off. J. Natl., Kidney Found., vol. 72, pp. 745-751.

Takasato et al., (2016) "Kidney organoids from human iPS cells contain multiple lineages and model human nephrogenesis." Nature 536, 238.

* cited by examiner

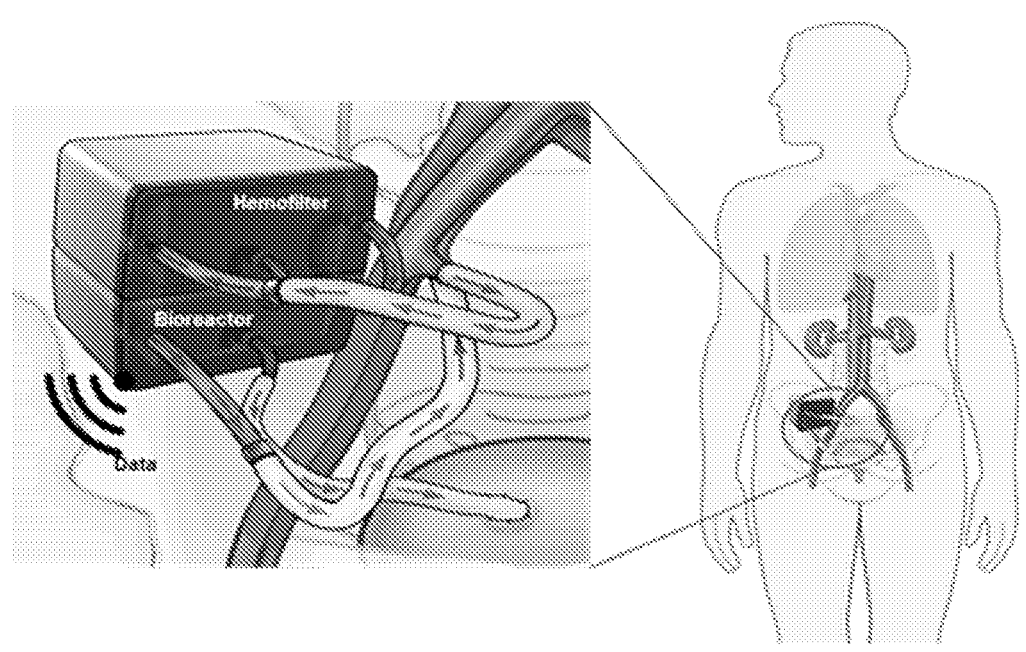
FIG. 1
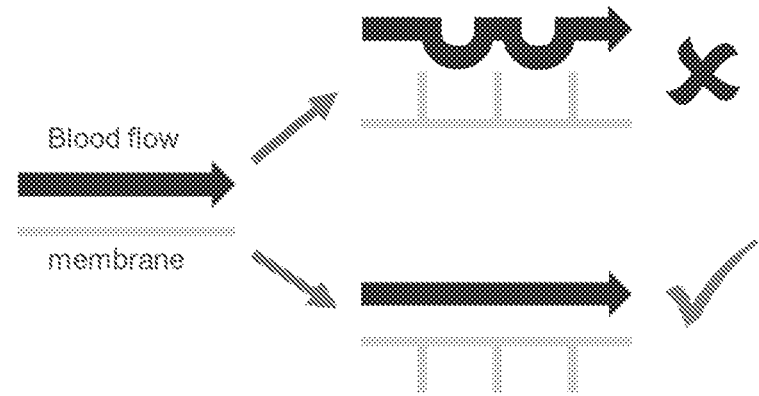
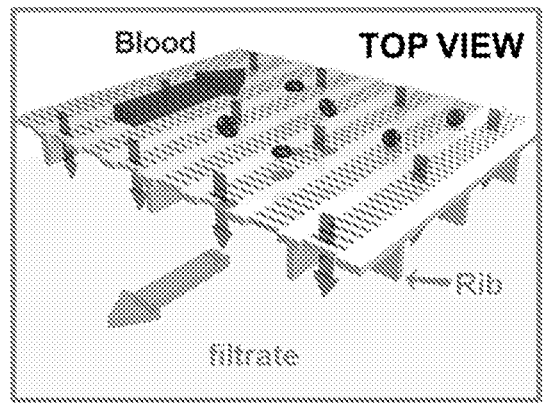
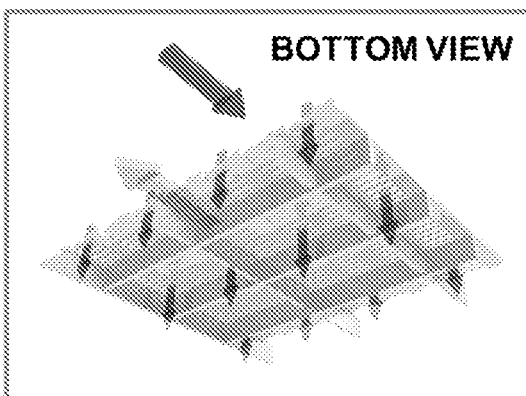
FIG. 2

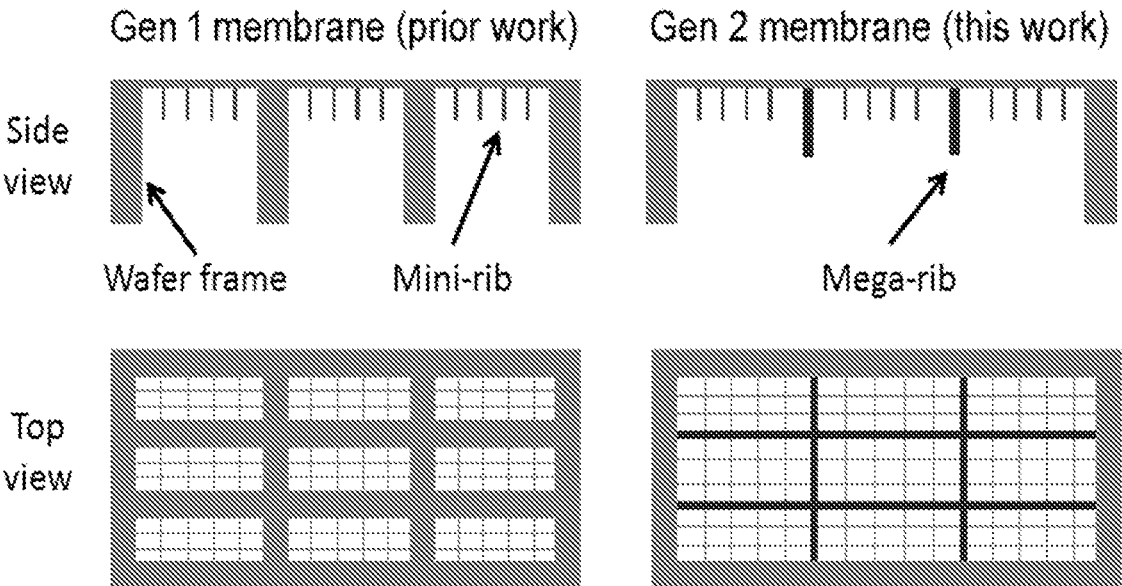
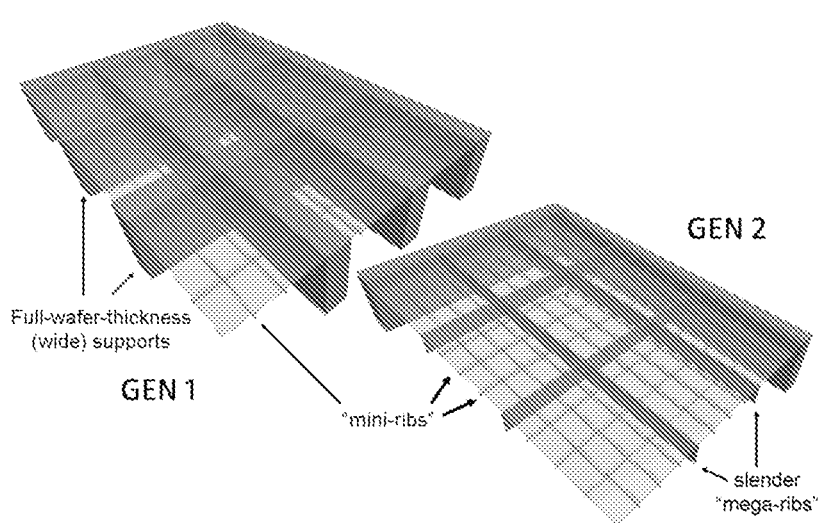
FIG. 3

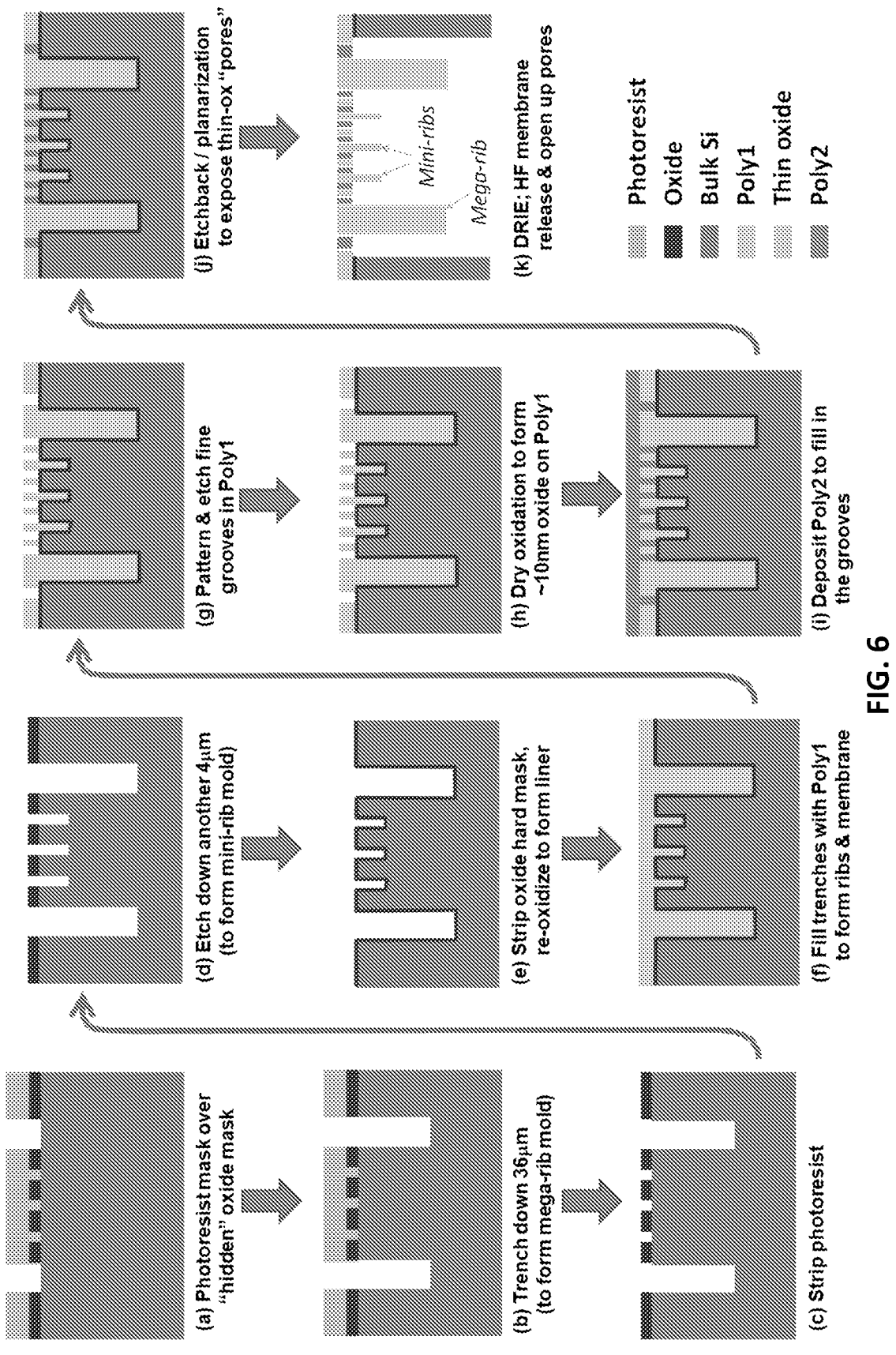

(a) Photoresist mask over "hidden" oxide mask (b) Trench down 36μm (to form mega-rib mold)

(c) Strip photoresist (d) Etch down another 4μm (to form mini-rib mold)

(e) Strip oxide hard mask, re-oxidize to form liner (f) Fill trenches with Poly1 to form ribs & membrane (g) Pattern & etch fine grooves in Poly1

(h) Dry oxidation to form ~10nm oxide on Poly1

(i) Deposit Poly2 to fill in the grooves (j) Etchback / planarization to expose thin-ox "pores"

(k) DRIE; HF membrane release & open up pores

Mini-ribs

Mega-rib

Photoresist
Oxide
Bulk Si
Poly1
Thin oxide
Poly2

FIG. 6

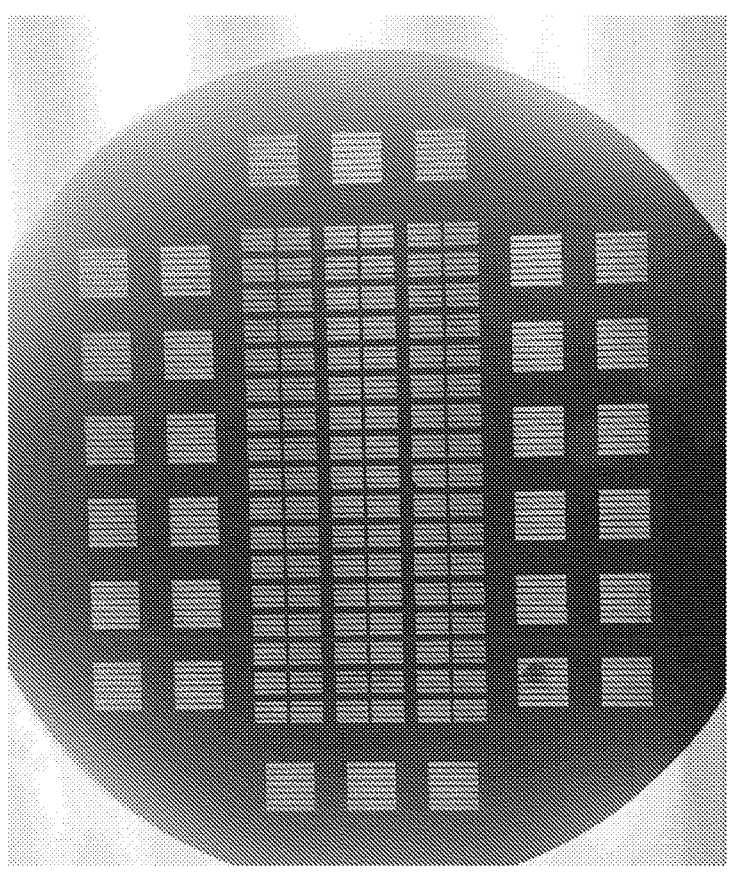
(a)
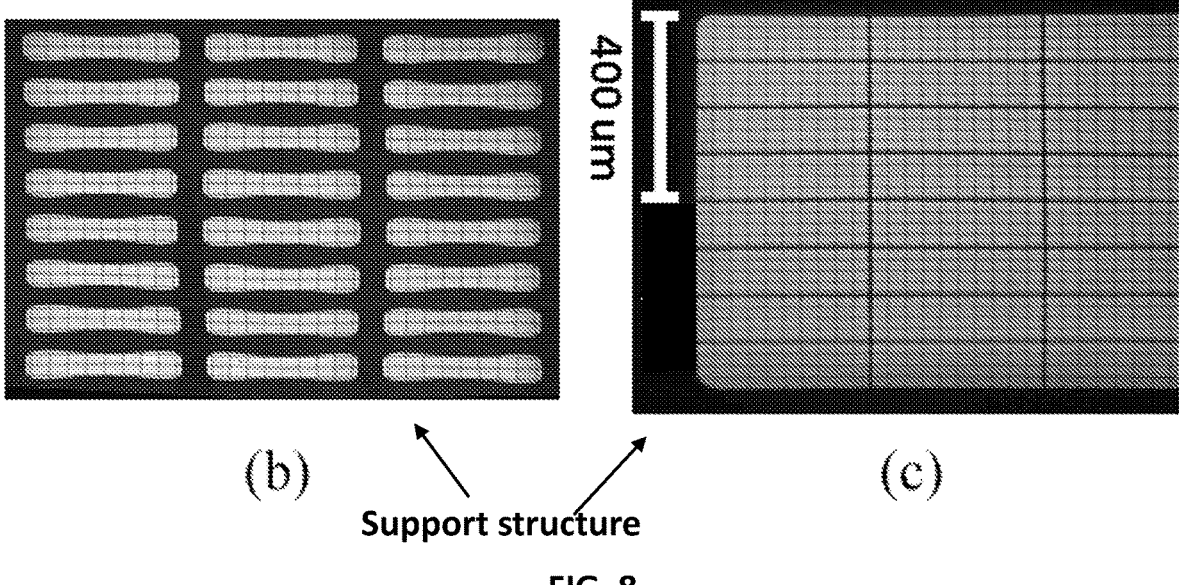
(b)
400 um
(c)
Support structure
FIG. 8

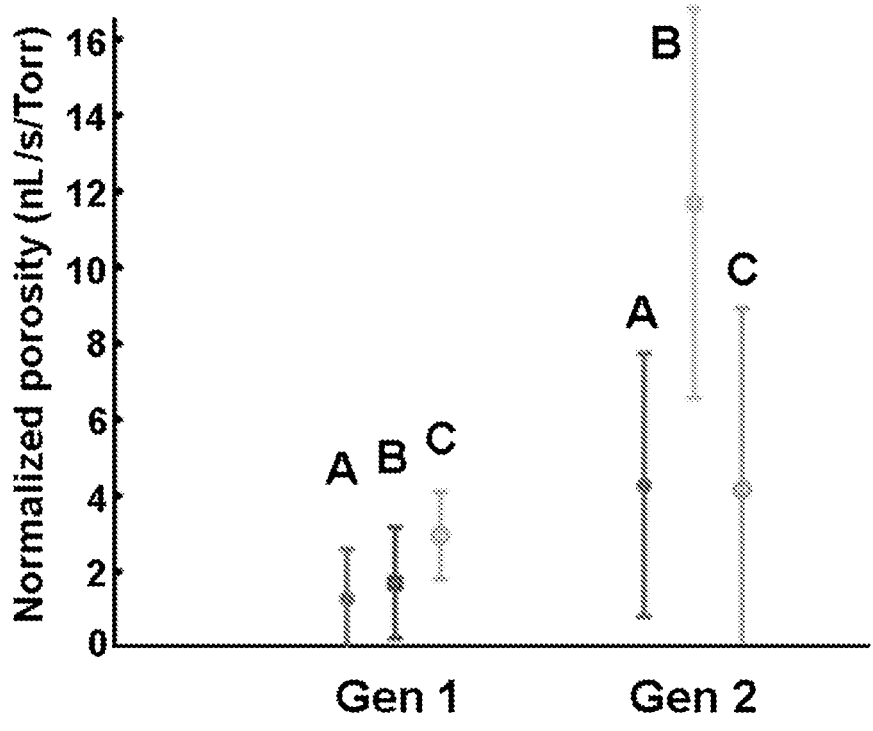
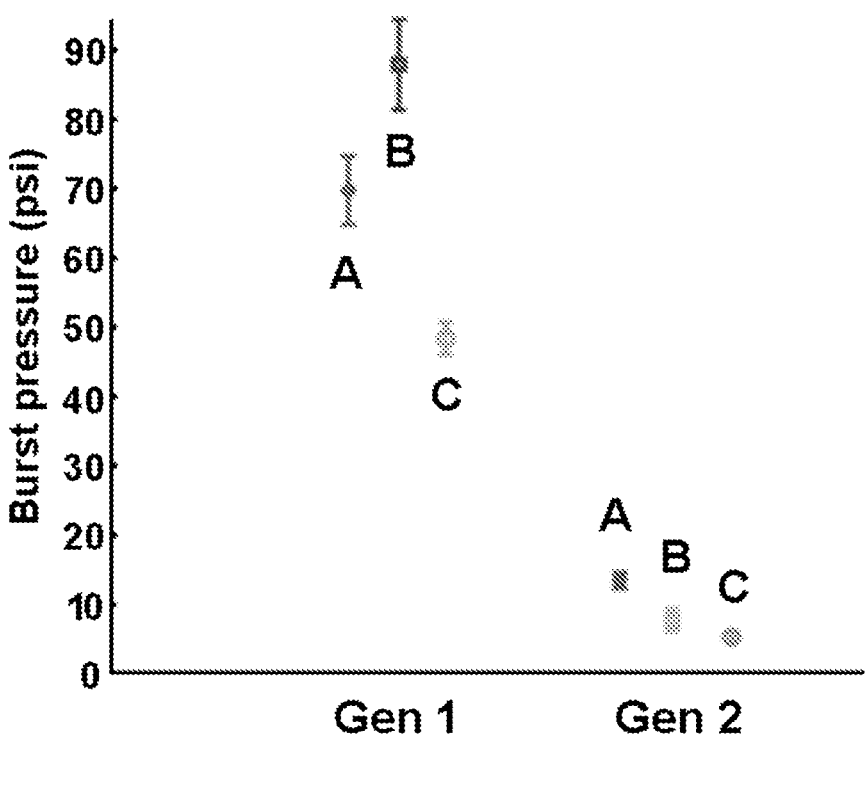
FIG. 9

FILTRATION MEMBRANE

CROSS-REFERENCE

This application is a 371 of PCT/US2021/044784 filed Aug. 5, 2021, which claims priority to U.S. Provisional Application Nos. 63/070,999 filed Aug. 27, 2020; and 63/063,038, filed Aug. 7, 2020, which are incorporated herein by reference.

GOVERNMENT RIGHTS

This invention was made with government support under U01 EB025136, R44 DK102240, and U01 EB021214 awarded by the National Institutes of Health. The government has certain rights in the invention.

INTRODUCTION

Chronic kidney failure afflicts over 2 million patients worldwide [1]. Current treatment options are dialysis and organ transplant. While kidney transplant provides the best clinical outcomes, the severe shortage of donor organs often forces kidney patients to remain on dialysis for an extended period of time (on the order of years), contributing to a poor quality of life and an increased mortality rate. In addition, regular trips to dialysis centers and undesirable buildup of urea and other toxins in the bloodstream between dialysis sessions tend to adversely affect patients' overall wellbeing [2-4]. It would be of great benefit to have a compact, portable, mass-producible, and ultimately implantable "bio-artificial kidney" that could perform the most critical renal functions.

The major limitations of dialysis treatment and limited availability of organs for kidney transplant have led to a growing interest in alternative renal replacement therapies. Current approaches in development include cell-based strategies, which aim to create a fully functional replacement organ [5-6]; wearable artificial kidney devices based on dialysis technology, which allow patients to receive prolonged and frequent treatments outside of the clinical setting [7-8]; and bio-hybrid devices that attempt to mimic key functions of the native nephron [9-10].

Fundamental to achieving such alternate renal replacement therapies is development of a filtration membrane of submicron thickness that is resistant to breakage but provides sufficient filtration surface. The present disclosure addresses these and other needs.

SUMMARY

The present disclosure provides an improved filtration membrane suitable for filtration of blood in vivo. The improved filtration membrane is resistant to breakage with minimal areal penalty due to presence of a system of supports on the backside of the membrane. The minimal areal penalty is achieved by using supports that provide a hierarchical scaffolding that comprises ribs of at least two different heights as explained in detail herein. Methods for making and using the filtration membrane are also provided.

BRIEF DESCRIPTION OF THE FIGURES

FIG. 1. The implantable bio-artificial kidney concept. The hemofilter removes toxins from blood while the bioreactor encapsulates renal cells to provide metabolic function. Sili-con nanoporous membranes provide the fundamental enabling technology for both the hemofilter and the bioreactor.

FIG. 2. To reinforce nanoporous membranes integrated ribs are added only to the backside so as not to interfere with blood flow.

FIG. 3. Comparison of Gen 1 and Gen 2 ribbed membranes. In Gen 2, many of the wafer frames are replaced by more slender and shorter "mega-ribs" under the polysilicon membrane, thus freeing up more filter area.

FIG. 6. Mega-rib membrane fabrication process flow. Compared to prior work [21], (a)-(d) represent newly added steps that enable the formation of dual-depth trenches and therefore ribs of different heights. In particular, step (b) in essence forms the mega-rib mold, while step (d) forms the mini-rib mold. Also, the dry oxidation of step (h) forms the thin oxide that determines the precise width of the nanopores and therefore the principal filtration characteristics of the membrane.

FIG. 8. Backlit optical image of fully released 100 mm-diameter mega-ribbed nanoporous-membrane wafer showing almost perfect device yield (a); (b-c): Backlit optical-microscope images of actual freestanding nanoporous membranes showing the gain in available membrane area going from Gen 1 (b) to Gen 2 (c).

FIG. 9. Measured porosity (top) and burst pressure (bottom) for Gen 1 and Gen 2 membranes. A minimum of seven devices was measured for each data point. From the data, it can be seen that the Gen 2 devices (i.e., the mega-rib membranes) exhibit significantly higher porosity at the expense of lower (but still acceptable) burst pressure. The labels "A", "B", and "C" denote membrane types (sizes) of 0.6×4 mm, 0.8×4 mm, and 1.0×4 mm respectively.

DEFINITIONS

Figure 4:
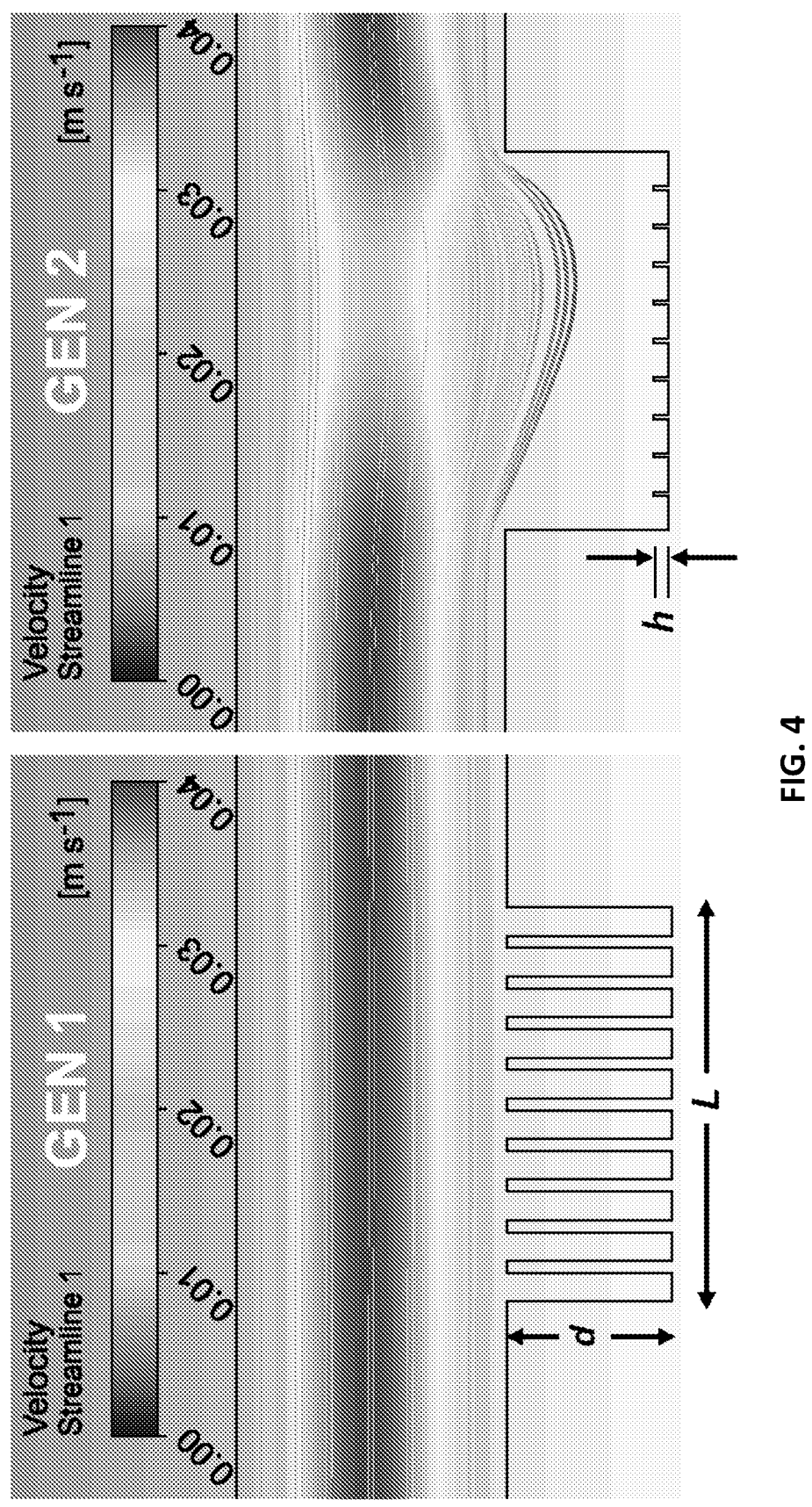
FIG. 4. Computational fluid dynamics (CFD) simulation of fluid flow (from left to right) past an array of closely spaced 400 $\mu$m-tall wafer-thick supports (Gen 1; left), and shorter (h=40 $\mu$m) mega-ribs (Gen 2; right). In the Gen 2 case, the fluid flow dips into the etch cavity thus boosting toxin removal. The cavity as depicted is 1 mm long (L) by 400 $\mu$m deep (d). Simulation results showed that the mass-transport factor could be almost 4× higher.

All publications, patents and patent applications cited herein, whether supra or infra, are hereby incorporated by reference in their entireties.

In describing the present invention, the following terms will be employed, and are intended to be defined as indicated below.

It must be noted that, as used in this specification and the appended claims, the singular forms "a", "an" and "the" include plural referents unless the content clearly dictates otherwise. Thus, for example, reference to "a membrane" includes a plurality of two or more such membranes, and the like. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

By "subject" or "individual" is meant any member of the subphylum Chordata, including, without limitation, humans and other primates, including non-human primates such as chimpanzees and other apes and monkey species; farm animals such as cattle, sheep, pigs, goats and horses; domestic mammals such as dogs and cats; birds; and laboratory animals, including rodents such as mice, rats and guinea pigs, and the like. The term does not denote a particular age. Thus, both adult and newborn individuals are intended to be covered. The individual may be a patient in need of hemodialysis, e.g., a patient with a compromised kidney function and/or in need of dialysis, compromised heart function, and/or compromised liver function.

The term "about" as used herein when referring to a measurable value such as a physical quantity, a temporal duration, and the like, is meant to encompass variations of ±20%, such as ±10%, such as ±5%, ±1%, including ±0.1% from the specified value, as such variations are typical of measurements characterizing the disclosed devices or appropriate to perform the disclosed methods.

As used herein "substantially", may be applied to modify any quantitative representation that could permissibly vary without resulting in a change in the basic function to which it is related. For example, substantially parallel may encompass structures that are slightly non-parallel to each other.

A "plurality" contains at least 2 members. In certain cases, a plurality may have at least 10, at least 20, at least 30, at least 40, at least 50, at least 70, at least 90, at least 100, at least 1000, at least 10,000, at least 100,000, at least 106, at least 107, at least 108 or at least 109 or more members.

"Biocompatible," as used herein, refers to a property of a material that allows for prolonged contact with a tissue in a subject without causing significant toxicity or significant damage and optionally without causing significant damage or deterioration of the material.

"Planar" as used herein, may be applied to describe a three-dimensional shape of any object, where the length scale of two dimensions that are substantially perpendicular to each other (e.g., length and width) is longer than the length scale of a third dimension (e.g., thickness) that is substantially perpendicular to both of the other two dimensions. The length scale of one of the two longer dimensions may be similar to or different from the other longer dimension. Planar when used in the context of a surface refers to a substantially flat surface as opposed to a surface that includes protrusions. A membrane layer as provided herein may include a first surface that is substantially planar, i.e., the length and width define a plane surface that is smooth as it does not include significant protrusions or depressions, and a second surface opposite the first surface that may be non-planar, e.g., having protrusions or ribs extending from the second surface which protrusions or ribs are separated by substantially smooth surface. The first surface of the membrane formed from the membrane layer has a plurality of nanopores extending between the first and second surface, where the nanopores are absent from the regions where the protrusions are present.

"Nanopore" as used herein, refers to a pore that penetrates a membrane from one side to another, where the pore has at least one lateral dimension (e.g., width and/or length, but not the height/thickness of the pore across the substrate) that is in the nanometer range, e.g., in the range of 1.0 nm to 1,000 nm.

As used herein, the term "polysilicon" refers to a polycrystalline form of silicon that is deposited as a thin film. It is used in microelectronics for transistors and wiring. In MEMS, polysilicon is usually used as structural material for devices.

"Pumpless" as used in reference to a blood circuit is meant to refer to the absence of a pump mechanism other than the pump mechanism (e.g., the heart) that drives blood flow through the circulatory system of an individual.

As used herein, the term "filtration" refers to a process of separating particulate matter from a fluid, such as a liquid, by passing the fluid carrier through a medium that will not pass the particulates to a significant extent.

As used herein, the term "dialysis" refers to a form of filtration, or a process of selective diffusion through a membrane; it is typically used to separate low-molecular weight solutes that diffuse through the membrane from the colloidal and high-molecular weight solutes such as albumin and immunoglobulins and suspended matter such as cells which do not. In some embodiments, a feed of fluid is passed over a semipermeable membrane, and a feed of dialysate is passed over the other side of that membrane; the membrane is wetted by one or both fluids, and then there is diffusive transport of solutes between the fluids. The composition of one fluid, the dialysate, may be used to deplete the composition of the other fluid, the feed fluid, of some molecule or molecules.

As used herein, the term "ultrafiltration" refers to subjecting a fluid to filtration under pressure, where the filtered material is very small; typically, the fluid includes colloidal, dissolved solutes or very fine solid materials, and the filter is a microporous, nanoporous, or a semi-permeable medium. A typical medium is a membrane. The fluid to be filtered is referred to as the "feed fluid." During ultrafiltration, the feed fluid is separated into a "permeate" or "filtrate" or "ultrafiltrate," which has been filtered through the filter, and a "retentate," which is that part of the feed fluid which did not get filtered through the medium, or which is retained within the membrane. Ultrafiltration does not require a dialysate be passed over the other side of the membrane.

As used herein, the term "dialysate" is used to refer to the fluid into which low-molecular weight solutes diffuse through a membrane from another fluid (typically, the feed fluid) initially containing these solutes.

DETAILED DESCRIPTION

The present disclosure provides an improved filtration membrane suitable for filtration of blood in vivo. The improved filtration membrane is resistant to breakage with minimal areal penalty due to presence of a system of supports on the backside of the membrane. The minimal areal penalty is achieved by using supports that provide a hierarchical scaffolding that comprises ribs of at least two different heights as explained in detail herein. Methods for making and using the filtration membrane are also provided.

Before describing the present invention in detail, it is to be understood that this invention is not limited to particular materials or process parameters as such may, of course, vary. It is also to be understood that the terminology used herein is for the purpose of describing particular embodiments of the invention only, and is not intended to be limiting.

Although a number of methods and materials similar or equivalent to those described herein can be used in the practice of the present invention, the preferred materials and methods are described herein.

Filtration Membrane

A filtration membrane suitable for filtering blood in vivo is disclosed. The filtration membrane comprises a membrane section and a support section. The membrane section comprises a planar first surface and a second surface opposite the first surface and a plurality of nanopores, where the second surface comprises a ribbed surface. The ribbed second surface comprises ribs of a first height and ribs of a second height which is higher than the first height. The ribs of the first height define a plurality of first windows arranged in a grid pattern, the first windows comprising the plurality of nanopores. The ribs of the second height define a plurality of second windows arranged in a grid pattern, each of the plurality of second windows comprising a plurality of first windows. The support section forming a third window comprising the plurality of second windows, wherein the support section is attached to the second surface of the membrane section at a periphery of the membrane section and has a third height higher than the ribs of the second height. The surface area of the second surface of the membrane exposed by the third window is in the range of 0.1 mm$^2$-10 mm$^2$, e.g., 0.5 mm$^2$-10 mm$^2$, 1 mm$^2$-10 mm$^2$, or 1 mm$^2$-5 mm$^2$.

The ribbed second surface comprises ribs separated by planar sections where the nanopores are located. While ribs of a first height and a second height are described, it is understood that the second surface may additionally include one or more of ribs of a third height, ribs of a fourth height, and the like. For example, the ribbed second surface may comprise ribs of a first height, ribs of a second height, and ribs of a third height, where the third height is higher than the second height and the second height is higher than the first height. The ribs of the first height define a plurality of first windows arranged in a grid pattern, the first windows comprising the plurality of nanopores. The ribs of the second height define a plurality of second windows arranged in a grid pattern, each of the plurality of second windows comprising a plurality of first windows. The ribs of the third height define a plurality of third windows arranged in a grid pattern, each of the plurality of third windows comprising a plurality of the second windows. The support section forming a fourth window comprising the plurality of third windows, wherein the support section is attached to the second surface of the membrane section at a periphery of the membrane section and has a fourth height higher than the ribs of the third height. Including additional ribs where the height of the ribs increase in a hierarchical manner may further increase the surface area of the membrane that does not need to be supported by the support section, thereby further increasing surface area of the membrane available for filtration.

The membrane section may be formed from any suitable material, such as, materials that can be deposited or grown on a micro- or nano-thick scale. For example, the membrane may be made from membrane materials such as silicon, polysilicon, silicon carbide, ultra nanocrystalline diamond, diamond-like-carbon, silicon dioxide, SU-8, titanium, silica, silicon nitride, polytetrafluorethylene, polymethylmethacrylate, polystyrene, silicone, or various other materials. The membrane material may be deposited by any suitable means, such as, low pressure chemical vapor deposition (LPCVD).

The thickness of the membrane layer may be less than 5 μm, e.g., 5 μm-0.5 μm, 4 μm-0.5 μm, 3 μm-0.5 μm, 2 μm-0.5 μm, 1 μm-0.5 μm, 0.8 μm-0.4 μm, 0.4 μm-0.1 μm, 0.1 μm-0.01 μm, or 0.05 μm-0.01 μm. Select examples of membrane material includes polysilicon, silicon, silicon nitride, silicon carbide, graphene and diamond and combinations thereof.

The support section may be formed of any inert material that does not foul when exposed to aqueous fluids, such as, ultrafiltrate filtering across the membrane. In some cases, a semiconductor material such as silicon wafer may be used for forming the support section. The silicon wafer that may have a variety of crystal orientations including a [100] plane orientation as listed by the Miller indices. In other cases, support section may be formed from a substrate is formed from germanium, Group IV elements of the periodic table, III-V compounds including gallium arsenide, II-IV compounds including zinc tellurium, p and n doped compounds, and the like. The substrate may be substantially planar and may have circular or straight edges. The substrate may be cut into rectangular pieces or circular pieces after or prior to formation of the filtration membrane. The thickness of the substrate may be less than about 400 μm, about 500 μm, about 600 μm, about 700 μm, about 900 μm, etc. or more. In some examples, the support section is formed using a silicon wafer.

The nanopores may have a depth of about 1 μm or smaller. For example, the nanopores may have a depth of about 0.9 μm to 10 nm, 0.8 μm to 100 nm, or 0.8 μm to 500 nm. In certain embodiments, the plurality of nanopores have a circular or slit shaped opening with a diameter or width, respectively, of 1 nm-500 nm, e.g., 1 nm-90 nm, 2 nm-50 nm, 3 nm-40 nm, 4 nm-50 nm, 4 nm-40 nm, 5 nm-50 nm, 5 nm-20 nm, 4 nm-20 nm, 7 nm-100 nm, 12 nm-20 nm, or 5 nm-10 nm. In certain embodiments, the plurality of pores are slit shaped and have a width as listed herein and have a length in the range of 1 μm-10 μm, e.g., 2 μm-3 μm, 3 μm-4 μm, 4 μm-5 μm, 5 μm-6 μm, 6 μm-7 μm, 7 μm-8 μm, 8 μm-9 μm, or 9 μm-10 μm. In certain cases, the slit shaped, i.e., rectangular pores have a depth of 100-900 nm, a width of 3 nm-50 nm and a length of 1 micron-5 micron, e.g., a width×length×depth of 5 nm-50 nm×1 micron-2 micron× 200 nm-500 nm. The depth of the pores may be defined by the thickness of the membrane which may be in the range of 0.01 micron-100 micron. In certain aspects, the nanopores are not present in regions of the membrane section that extend to form ribs. In other words, the nanopores are absent from regions of the membrane where the second surface is non-planar and extends to form the ribs. In certain aspects, the nanopores are not present in regions of the membrane section that are covered by the support section.

The ribs of the first height extend from the second surface of the membrane and define a plurality of first windows arranged in a grid pattern. A plurality of the nanopores are present inside each of the first windows. For examples, see FIG. 7, panel (f) which shows ribs of a first height and regions of the membrane comprising nanopores supported by the ribs. These ribs are also visible in FIG. 7, panel (e), while the nanopores are not visible at this magnification. These ribs are also referred to as mini-ribs. These ribs of the first height may be arranged in a grid-like pattern such that the first windows are arrayed in a side-by-side orientation, in a two-dimensional configuration. The first windows may be rectangular, e.g., square shaped. The thickness of the ribs of the first height at the second surface of the membrane may be 0.5 μm-5 μm, e.g., 1 μm-2.5 μm. The height of the ribs of the first height may be 2 μm-10 μm, 3 μm-8 μm, or 3 μm-6 μm. The size of each of the first windows may be 200-5000

µm², e.g., 300-5000 µm², 500-5000 µm², 800-5000 µm², 200-1000 µm², 300-1000 µm², 500-1000 µm², or 100-5000 µm². In certain embodiments, the first windows may be rectangular in shape. The length of the first windows may be 20-100 µm. The width of the first windows may be 10-50 µm.

Figure 7:
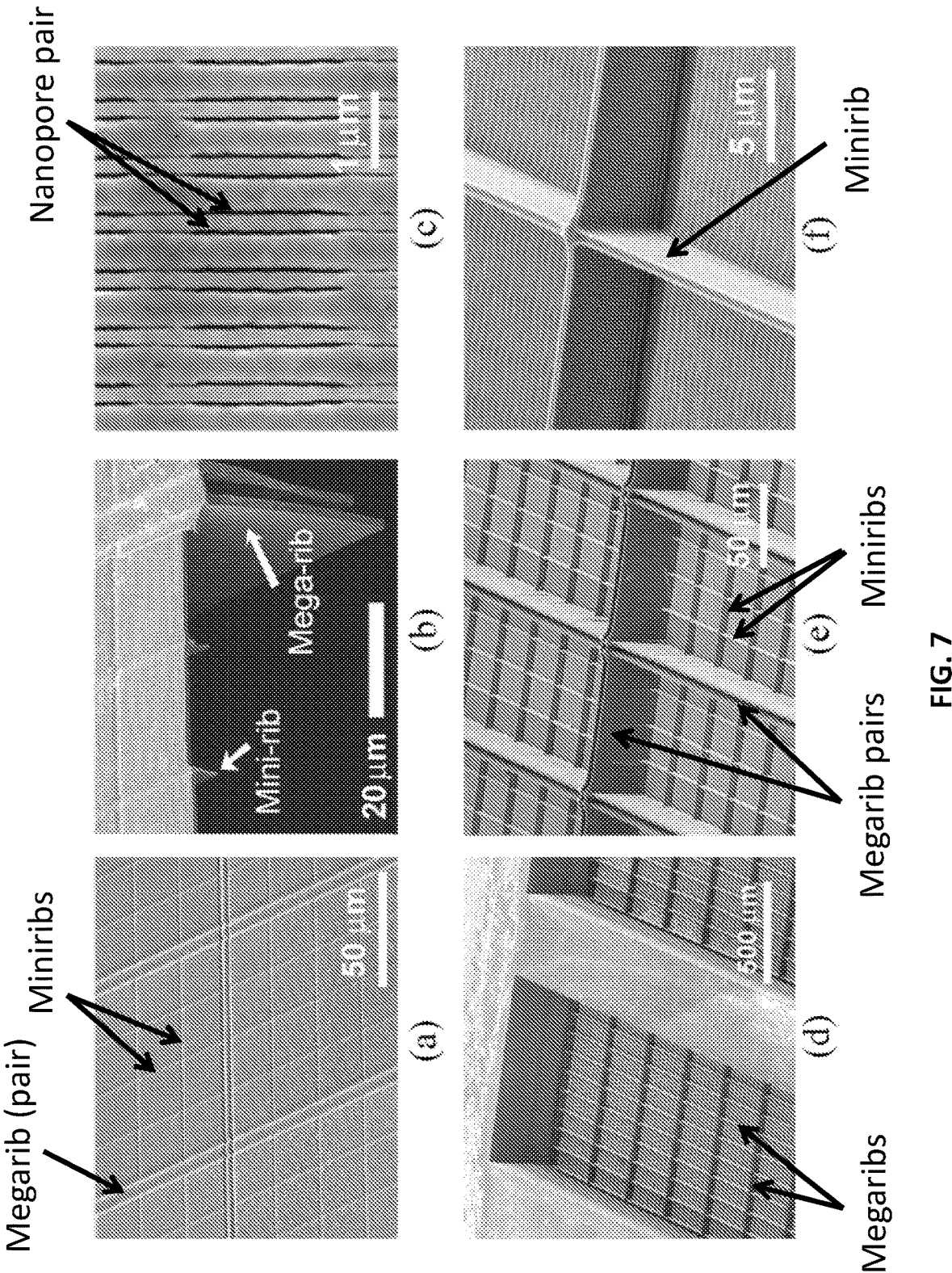
FIG. 7. Scanning electron micrographs (SEMs) of (a) Top view of mega-rib membrane; (b) Cross-section showing mini-ribs and mega-rib; (c) Close-up top view of nanopores; (d) Backside image of mega-rib membrane showing silicon-wafer "frame" and mega-ribs; (e) Further close-up showing mega-ribs and mini-ribs; (f) Even further close-up showing mini-ribs and nanopores.

The ribs of the second height extend from the second surface of the membrane and define a plurality of second windows arranged in a grid pattern, where a plurality of the first windows are present within each of the second windows. For examples, see FIG. 7, panel (d) and (e) which show the ribs of the second height present around a grid-shaped pattern of the first windows (see panel (e)). In panel (d) of FIG. 7 the individual first windows are not visible but the grid-shaped pattern of the second windows is visible. See also FIG. 7, panel (a). The second windows may be rectangular, e.g., square in shape. The number of first windows present within each of the second windows may be from about 10-100, about 10-50, about 10-40, about 10-30, or about 10-20 first windows. The ribs of the second height are also referred to as mega-ribs. The height differential between the ribs of the first height and ribs of the second height is depicted in FIG. 7, panel (b). In certain embodiments, the ribs of the second height may be about 5 to 50 times the height of the first ribs, e.g., 5 to 40 times, 5 to 30 times, 5 to 20 times, or 5 to 10 times the height of the first ribs, e.g., up to 6 times, 7 times, 8 times, 10 times, 15 times, 25 times, or 35 times the height of the first ribs. In certain embodiments, the ribs of the second height may be have a height of about 20-250 µm, e.g., 20-200 µm, 20-100 µm, 20-80 µm, 20-50 µm, or 30-50 µm. The thickness of the ribs of the second height at the second surface of the membrane may be 1 µm-20 µm, e.g., 1 µm-15 µm, 5 µm-20 µm or 5 µm-15 µm.

The ribs may be tapered in shape where the width of the ribs decreases as it extends from the membrane. In other embodiments, the ribs may be uniform in thickness. The ribs may be a single wall structure or may be double walled. A double wall rib requires less membrane material and hence may be used to decrease cost associated with volume of membrane materials. An example of ribs having a double walled structure is depicted FIG. 7, panel (f) showing double walled mini-ribs and FIG. 7, panels (a), (b), and (e) showing double walled mega-ribs.

The support section forms a third window and is located along the periphery of the membrane. This third window provides access to the nanopores for a fluid flowing on the back side of the filtration membrane. The third window is formed by creating a cavity in the planar substrate used to form the support section, as explained in the section on method of making the filtration membrane. This third window may thus also be referred to as a cavity, where the walls of the cavity are formed by the support section. The plurality of second windows is present within the third window, e.g., as visible in FIG. 7, panel (d).

As discussed in the Examples section, a key feature of the disclosed filtration membrane is the increased surface of the membrane that is available for filtration due to the hierarchical support structure present on the second surface of the membrane, where the support section has a height longer than the ribs of the second height, which are longer than the ribs of the first height. The ribs of the first height support a section of the membrane that is planar on the first and the second surface and includes the nanopores. These ribs are also referred to herein as mini-ribs. These ribs define a plurality of first windows. A plurality of such first windows are in turn structurally supported by ribs of a second height higher than the first height. These ribs are also referred to herein as mega-ribs. These mega-ribs allow for an increase in the area of the membrane that need not be supported by the support section. In other words, including the mega-ribs allows for positioning of the support section such that the third window formed by the support section occupies a minimal surface of the membrane per square area of the membrane. Since the areas of the membrane that are supported by the support section are not available for filtration, increasing the area of the membrane that need not be supported by the support section, increases the areas of the membrane that include nanopores at which filtration can occur. The ribs of the second height are substantially thinner than the support section in contact with the second surface of the membrane and hence do not block as much surface of the membrane as would be blocked if the support section was present. See FIGS. 7 and 8. In addition, the mega-ribs are substantially lower in height as compared to the height of the support section which allows for better fluid flow on the backside if the membrane. See FIG. 4. The presence of the ribs of a first height and a second height allows for the area of the membrane enclosed by the third window and hence available for filtration to be increased substantially as compared to the area of the membrane exposed in the cavity as described in WO2019/222661. For example, the area of the backside of the membrane exposed by the cavity is in the range of 10,000-50,000 µm² in WO2019/222661. In contrast, the area of the backside of the membrane exposed in the cavity, i.e., enclosed by the third window is in the range of 1 mm²-10 mm², 2 mm²-8 mm², or 3 mm²-6 mm². A comparison of the backside of the membrane exposed by the cavity in the membrane disclosed in WO2019/222661 to the presently disclosed membrane is provided in FIG. 8, panels (b) and (c). In certain embodiments, the third window may be substantially rectangular (e.g. square) in shape. In certain embodiments, the third window has a length of about 1 cm and a width of about 1 cm. In certain embodiments, the third window has a length of about 2000 µm-5000 µm and a width of 500 µm-1000 µm. In certain embodiments, the third window has a length of about 4000 µm-5000 µm and a width of about 1000 µm. In certain embodiments, the height of the third window corresponds substantially to the thickness of the substrate used for forming the support section. The third height may be 500 µm-200 µm or 500 µm-300 µm. The width of the support section in contact with the membrane section may have a thickness of about 20 µm-50 µm or 30 µm-50 µm. The plurality of second windows within the third window may include 50-100 second windows. The membrane section and support section may be connected directly or more usually via an intermediate layer.

The first windows, the second windows, and/or the third window and/or any additional windows that are present on the backside of the membrane may have any shape, such as, rectangular, hexagonal, trapezoidal, circular, and the like. For example, the mold for the ribs may be in a rectangular, hexagonal, trapezoidal, circular, or another shape or a combination of such shapes. In addition, the first windows may be of one shape and the second window of another shape and the third window may have the same shape as the first or the second windows or a different shape.

The filtration membrane described herein may be used to make a filtration device that includes a plurality of such filtration membranes arranged in a side-by-side configuration. For example, the filtration device may include a plurality of filtration membranes formed using a single substrate on which a plurality of membrane sections and support sections are formed.

Method of Making Filtration Membrane

A method for generating the filtration membrane for in vivo filtration of blood is disclosed. The method may include depositing a first mask in a first pattern on a first surface of a support substrate. The first pattern may cover and protect certain areas of the first surface and expose areas on the first surface which areas define outlines of a plurality of first rectangles arranged in a grid pattern and a plurality of second rectangles arranged in a grid pattern. Once formed each of the plurality of second rectangles include a plurality of the first rectangles. The method may further include depositing a second mask on the first mask such that the second mask covers the exposed areas on the first surface which areas define outlines of the first rectangular windows and does not cover the exposed areas on the first surface which areas define outlines of the second rectangular windows thereby allowing etching of the first surface to create grooves in the support substrate corresponding to the outlines of the second rectangular windows. See for example, FIG. 6, panel (a), which shows substrate (bulk silicon "bulk Si"), first mask ("oxide) and second mask ("photoresist"). The method may further include etching the first surface to create the grooves, the grooves having a depth and a thickness; removing the second mask, wherein the removing the second mask exposes areas on the first surface defining the outlines of the plurality of first rectangles. The method may further include etching the first surface to increase the depth of the grooves of the plurality of the second rectangles and to create the grooves in the support substrate corresponding to the outlines of the plurality of the first rectangles such that the depth of the grooves for the second rectangles is more than that of the first rectangles. These grooves may also be referred to as trenches that have been created in the substrate to create a mold that is filled in. See for example, FIG. 6, panels (b) and (c) showing molds for the mega-ribs and FIG. 6 panels (d)-(e) showing molds for the min-ribs.

The method further includes removing the first mask and depositing an intermediate layer over the support substrate. The intermediate layer is a thin layer deposited such that the thickness of the layer is substantially uniform, see, e.g., FIG. 6, panel (e). The intermediate layer, in certain cases, may be deposited by creating an oxide layer on the substrate, thereby forming a thin film on the surface of the substrate. The intermediate layer may be a protective layer, such as, a dielectric layer. In some cases, the intermediate layer may be formed by depositing an oxide or nitride layer over the substrate or may be grown on the substrate. The intermediate layer may be deposited by chemical vapor deposition (CVD) including low pressure CVD (LPCVD) and plasma enhanced CVD (PECVD), or by some other deposition means. In some cases, the intermediate layer may be grown with a thermal process, such as thermal oxidation. The intermediate layer may include a silicon nitride, silicon oxide, silicon oxynitride, silicon carbide, or some other layer of material including other dielectric materials and combinations. The thickness of the intermediate layer may be about 2 μm or less, e.g., 2 μm-0.1 μm, 1 μm-0.2 μm, 1 μm-0.5 μm, or 0.8 μm-0.5 μm.

The method may further include depositing a membrane material to fill the grooves of the first and second rectangles created in the support substrate to create a membrane comprising a planar first surface and a non-planar second surface opposite the first surface, the non-planar second surface comprising a plurality of ribs having a first height corresponding to the depth of the grooves for the first rectangles and a plurality of ribs having a second height corresponding to the depth of the grooves for the second rectangles, wherein the second height is higher than the first height. See for example, FIG. 6, panel (f) ("poly1").

The method may further include creating a pattern of fine grooves in regions of the membrane (see FIG. 6, panel (g)) and depositing a sacrificial layer on the membrane ("thin oxide"). The sacrificial layer may be formed by oxidizing the membrane material thereby forming a thin layer of oxide on the exposed regions of the membrane. In some cases, pore structures may be formed with a sacrificial material that may be later removed to form pores through the membrane layer. The nanopore structure may be formed with an etching process, or other lithography process. The membrane layer may be patterned with a photoresist that may be performed via e-beam, deep ultraviolet lithography, or another patterning technique that can form patterning for creating structures as described herein. The resist pattern may be transferred via a reactive ion etch or wet etch process onto the membrane layer. Following the patterning, a sacrificial layer of material may be formed on or within the patterned membrane layer. The sacrificial layer may be an oxide grown via thermal oxidation that may be less than 20 nm thick. Alternatively, the layer may have a thickness of less than or about 15 nm, 10 nm, 7 nm, 5 nm, 3 nm, 1 nm, 5 angstroms, etc., or less. The layer of material may be conformal when grown, and thus the film may be formed via a more conformal process including high density plasma CVD (HDPCVD), or some other conformal deposition process. The layer may be silicon oxide, or any other material that can be subsequently removed from the membrane layer to create the membrane with nanopores.

The method may further include filling the fine grooves with additional membrane material. The additional membrane material may be same material deposited initially or a different material. See, FIG. 6, panel (i) ("poly2"). Next, the method may involve removing excess additional membrane material not deposited in the fine grooves (FIG. 6, pane; (j)); removing the sacrificial layer from the membrane and removing the intermediate layer and forming a cavity in the second surface of the support structure, wherein the second surface is opposite the first surface to provide: a plurality of nanopores in the membrane, a plurality of first windows defined by the plurality of ribs having the first height, a plurality of second windows defined by the plurality of ribs having the second height, wherein each of the plurality of second windows comprise the plurality of first windows, and a third window having a third height defined by the support structure and formed by the walls of the cavity, wherein the third height is higher than the second height and wherein the third window comprises the plurality of second windows. See, e.g., FIG. 6, panel (k). While this embodiment describes the use of two membrane materials for forming a membrane with nanopores, in other embodiments, the nanopores may be formed in a membrane formed from a single membrane material. For example, a membrane layer may be formed from a membrane material and nanopores formed therein by directly patterning and etching into the membrane layer.

The various steps of the method may be performed by any suitable means. In general, all of the steps till the creation of the third window are carried on the front side of the substrate.

In certain embodiments, etching may be wet etching using a wet etchant such as, potassium hydroxide, tetramethylammonium, buffered hydrofluoric acid, EDP, etc. The determination of when to stop the etch process can be based on a desired depth of the grooves. The wet etch may be isotropic or orientation selective, i.e., anisotropic. Etching may produce grooves with straight sides or sloped sides. In other embodiments, etchants can be used that are more anisotropic and produce little or no sloping of the groove walls. Alternatively, a reactive ion etching, e.g., Deep Reactive Ion Etch (DRIE), such as that relying on the Bosch process may be performed.

The substrate may act as a support section for the membrane. For example, the second surface of the membrane may be exposed in the cavity in the substrate, wherein the remainder of the substrate defining the boundary of the cavity, i.e., the third window provide mechanical support to the membrane.

The layer of sacrificial material may be selectively removed in certain areas with a subsequent photoresist patterning and etch. This may provide areas for anchoring a second membrane layer to the first membrane layer during a subsequent deposition. After removing the photoresist, a second membrane material may be deposited filling in the anchor cavities, as well as the areas around the sacrificial layer in and around the trenches formed in the first membrane material. This material may be the same or a different membrane material as previously described. For example, the second membrane material may also be polysilicon. The second membrane material layer may be planarized down at least to a level exposing the sacrificial material, and thereby forming the pore structure. The planarization may occur with any polishing or etching technique and can include a reactive ion etch in one example. In still another example, the anchors may be formed and filled subsequent to depositing the second membrane material and performing a planarization. The process may alternatively be performed by performing an additional lithography step followed by a direct etching, such as with a reactive ion etch, followed by a specific deposition for the anchor material.

The nanopores may also be more densely patterned by performing a series of patterning and deposition processes. For example, subsequent to the initial deposition of the membrane material, a secondary patterning step similar to that as described above may be performed. Once the secondary patterning has been performed, an additional protective layer may be deposited in a way as previously described. Following the formation of the additional protective layer, a subsequent layer of membrane material may be formed to provide the degree of pore spacing required. The repetitive processing may reduce the line and space pattern by 20% or more. Alternatively, the repetitive processing can reduce the line and space pattern by about 30% or more, about 40%, about 50%, about 55%, about 60%, about 65%, about 70%, about 75%, about 80%, about 85%, about 90%, etc., or more. By maintaining the protective material within the pores during fabrication, pore integrity may be maintained until a final release is performed.

A second protective layer may be applied over the membrane materials prior to backside etching of the substrate to form the cavity and expose the membrane. The second protective layer may include an oxide, nitride, or another compound depending on the etching technique subsequently performed. For example, a nitride layer may be deposited if a potassium hydroxide etch is performed, and an oxide layer may be deposited if the subsequent etch includes a chemical selective to nitrogen, such as tetramethylammonium hydroxide.

Method of Using Filtration Membrane

The filtration membranes may be integrated into a housing comprising pre-fabricated partial channels which in conjunction with the filtration membranes form flow path for blood flowing through the filtration device. The filtration membranes may be inserted into the housing comprising the pre-fabricated partial channels individually. Alternatively, a filtration membrane cassette formed by bonding filtration membranes in a spaced apart manner may be inserted into the housing and the cassette attached to the openings of the partial channels.

The filtration device can be used in vivo or ex vivo for filtering blood of a patient in need thereof.

EXPERIMENTAL

Below are examples of specific embodiments for carrying out the present invention. The examples are offered for illustrative purposes only and are not intended to limit the scope of the present invention in any way.

Efforts have been made to ensure accuracy with respect to numbers used (e.g., amounts, temperatures, etc.), but some experimental error and deviation should, of course, be allowed for.

Example 1—A Scalable, Hierarchical Rib Design for Larger-Area, Higher-Porosity Nanoporous Membranes for the Implantable Bio-Artificial Kidney Silicon nanoporous membranes provide the fundamental underlying technology for the development of an implantable bio-artificial kidney. These membranes, which are comprised of micromachined slit-pores that are nominally 10 nm wide, allow for high-efficiency blood filtration as well as immunoprotection for encapsulated cells. Our approach takes advantage of well-established semiconductor fabrication technology to give us precise dimensional control over pore widths, thereby enabling a highly selective filtration function and a clear path towards further miniaturization. This work builds on our prior results on "ribbed nanoporous membranes" by adding a second-level hierarchy of significantly taller "mega-ribs" to further strengthen the membranes. Relying on a two-step Deep Reactive Ion Etch (DRIE) process, we etch 4 µm-deep as well as 40 µm-deep trenches into a silicon substrate, grow a thermal oxide liner, and deposit a layer of polysilicon into this "mold" to form membranes which, when released after a backside DRIE etch, feature a network of reinforcing ribs on the underside. We have fabricated and tested freestanding membrane spans that are up to 14 times wider than before, with approximately double the measured permeability per unit area. The new architecture can also improve cross-membrane mass-transfer rates and reduce chip-fabrication costs.

Our group is utilizing the bio-hybrid approach to develop an implantable bio-artificial kidney that could perform the most critical renal functions and alleviate patients from the burdens of dialysis. This device utilizes silicon nanoporous membranes as the fundamental underlying technology to build a biocompatible hemofilter and a renal tubule cell bioreactor, which will work together to selectively separate wastes and reabsorb salts and water [11-12] (FIG. 1).

Over the years, many groups have used silicon-based MicroElectroMechanical Systems (MEMS) technology to develop porous membranes for biological and therapeutic uses [13-16]. For our current project—the bio-artificial kidney—our group has developed a reliable "silicon nanoporous membrane" process [17-18] that relies on thin oxidation to produce precisely controlled nanopores (on the order of 10 nm) in polysilicon membranes of submicron thickness. However, as our research progresses into more advanced stages of preclinical testing, we need to make our membrane devices absolutely robust to ensure that their susceptibility to breakage in vivo is negligible.

As membrane-based devices usually fail at their weakest point—the membrane itself—it is most important to reinforce that part. Obviously, the easiest solution would be to make the whole membrane thicker, but that would defeat the goal of having a thin membrane to reduce fluidic resistance through the pores. Therefore, we have to find a way of strengthening the structure without inordinately adding thickness or mass. Based on well-known mechanical principles, we decided to follow the route of using "ribs" or beams to reinforce the membrane [19] while minimizing any areal penalty incurred.

Our work is complicated by the fact that the ribs or beams have to be situated on the back side of the membrane (i.e., the filtrate side, not the blood side) (FIG. 2). Therefore, we cannot simply add extra features onto the top side of the wafer after the membrane has been formed; i.e., whatever we do has to occur before the polysilicon deposition in our case. In a way, this is not unlike the challenge faced by optical mirrors where the front side of the device has to remain smooth [19-20].

Our prior work on membranes with "mini-ribs" [21] offered a fabrication path that satisfied such constraints. By pre-embossing the wafer surface (i.e., etching a network of 1 um wide, 4 um deep trenches into the starting silicon substrate) and then adding a thermal oxide liner followed by polysilicon deposition to form the membrane, we were able to fabricate released membranes with backside-reinforced ribs, a key enhancement to the bio-artificial kidney. However, there is still room for improvement in fundamental chip-level filtration efficiency. We believe that the development of an implantable bio-artificial kidney can benefit greatly from an order-of-magnitude increase in membrane mass-transfer coefficient.

On the membrane-design level, one obvious factor that directly affects mass-transfer efficiency is the ratio of active membrane area vs. overall chip area. Note that in the current "Gen 1" device, some 40% of the chip area is dead space taken up by the Deep Reactive Ion Etched (DRIE) bulk-Si "frame" (FIG. 3 left) where the frame is the full thickness of the starting substrate. We therefore propose a "Gen 2" design with a thinner, lighter scaffolding (FIG. 3 right) that leaves more room for the active filter. However, simply shrinking the frame linewidth on the mask design would not suffice due to various reasons, including (i) DRIE aspect-ratio limitations, and (ii) undercut of the support frame during the membrane-release wet etch: if the lateral etch fronts in the buried oxide layer meet up from both sides of the "wall," the membrane will lose its physical anchor and detach from the frame.

Innovation and Design

In this work, we focus on replacing a majority of the 40 μm-wide, 400 μm-tall DRIE-defined "walls" with polysilicon "mega-ribs" that are 4 times narrower and 10 times shallower (FIG. 2 right), aiming to increase the porous-region fill factor from 63% to 88% (i.e., a 40% gain). The mega-rib height (40 μm) is designed to be the geometric mean of the original mini-rib height (4 μm) and the full wafer thickness (400 μm); hence the "hierarchical" nature of the design.

Fluidic Considerations

The adoption of these shallower mega-ribs is driven in part by fluid dynamics as well. In our current bio-artificial kidney design, blood flows parallel to the top (flat) membrane surface and filtrate flows anti-parallel along the bottom (ribbed) surface. Due to the thickness of the wafer-frame, however, most of the active filtrate flow is actually occurring a fair distance (hundreds of μm) away from the membrane plane, slowing down toxin removal thus hindering cross-membrane diffusion. We therefore performed computational fluid dynamics (CFD) modeling to investigate whether it is worth it to make the backside support structure shorter or sparser.

For the purposes of this simulation, ANSYS Fluent 19.2 software was used (FIG. 4). The geometry was set up as 2D; the material used was liquid water. The model was steady state with a velocity inlet boundary condition of 0.02381 m/s and a static pressure outlet. The inlet region was extended to allow for fully developed flow, while blood side membrane surface urea concentration was held constant. Model performance was assessed based on water outlet concentration (urea removed).

Our analysis showed that substantially lowering the height of the 400 □m-tall "obstacles" on the filtrate side would enhance the mass-transport of molecules through the membrane by almost 4×. In other words, incorporating mega-ribs into the support structure definitely helps boost filtration efficiency.

Mechanical Considerations

Besides microfluidic performance, we are also concerned about the mechanical characteristics of the mega-rib membrane design. In our prior work, the standard membrane "window" was 100×400 μm, but we are now trying to expand it to 1000×4000 μm (i.e., a full 100× larger in area) using mega-ribs. In doing so, we have to ensure that such a large freestanding span is still mechanically sound, i.e., membrane stiffness is not overly compromised by shrinking the support.

Figure 5:
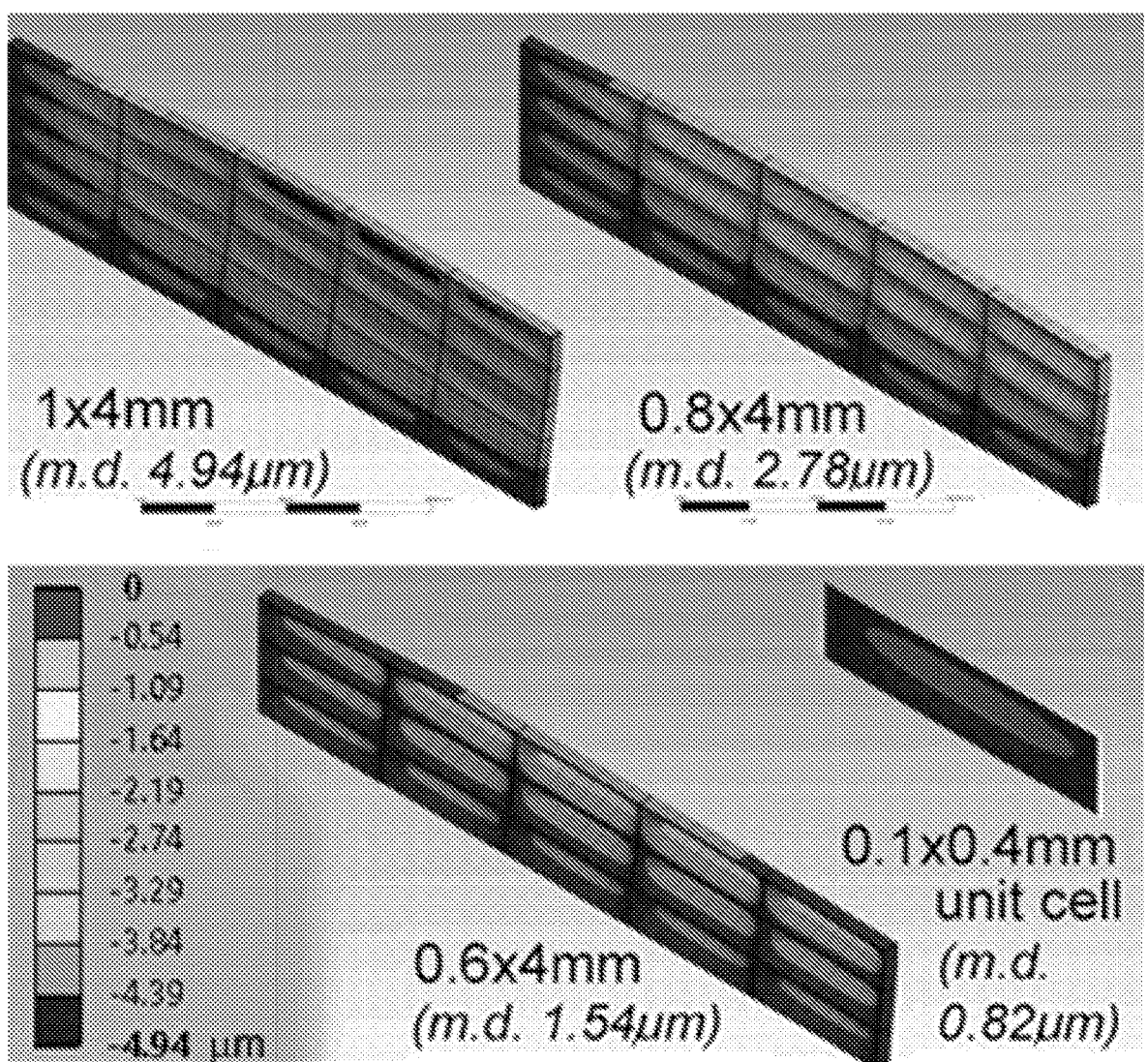
FIG. 5. Finite-element analysis (FEA) results showing maximum deflection ("m.d.") for Gen 2 mega-rib membranes of various sizes (0.6×4 mm, 0.8×4 mm, and 1.0×4 mm). To speed up the simulation, a quarter-membrane model was used to take advantage of the symmetry of the design. The small unit cell at the bottom right represents the old Gen 1 (non-ribbed) design.

We therefore turned to finite-element analysis (FEA) to compare the old design with the new. ANSYS Mechanical 19.2 software was used for all mechanical modeling in this study. Double symmetry planes were used for all models allowing for only one-quarter of the device geometry to be modeled. Hexahedral mesh elements were used. Fixed supports were applied on the boundary, and 300 mmHg pressure was applied to the blood-contacting surface of the membrane. FIG. 5 shows FEA results for a simple (non-ribbed) 100×400 μm membrane versus a 1000×4000 μm (mega-ribbed) membrane under a constant distributed load; the results indicate that the mega-rib membrane stiffness, while up to 5× lower, could still be acceptable.

Fabrication

Based on our earlier mini-rib membrane process [17, 20], we added an initial hidden-oxide-mask step wherein the mega-rib trenches are first etched down 36 μm (FIG. 6a-b); the overlying photoresist mask is removed with oxygen plasma and piranha; and then the mega-ribs and mini-ribs are both etched down another 4 μm (FIG. 6c-d). This process sequence enables the formation of a dual-depth trench network and therefore two different rib heights.

After this step, the process reverts to the existing flow: a conformal thermal oxide liner (the "buried oxide") is grown (FIG. 6e), a first polysilicon layer ("Poly1") is deposited both filling the trenches and forming the membrane layer (FIG. 6f), and a high-resolution lithography step prints a dense line-space array on the polysilicon. The pattern is then anisotropically etched into Poly1 down to the buried oxide, forming a series of ridges and grooves with largely square cross-sections (FIG. 6g).

A timed dry oxidation step forms a thin oxide ("thinOx") on the order of 10 nm (adjusted to correspond to the desired width of the eventual nanopores) on the Poly1 surface, including the vertical sidewalls of the ridges (FIG. 6h). A second polysilicon layer ("Poly2") is deposited to fill the grooves in Poly1 (FIG. 6i). (Note that Poly1 and Poly2 are separated by the thinOx layer except for periodic anchor regions not pictured here.) A plasma planarization step etches down the Poly1-thinOx-Poly2 stack past the original Poly1 surface, revealing the vertically oriented embedded thinOx "walls" that will eventually become the nanopores (FIG. 6j).

Finally, a passivation layer of low-temperature oxide (LTO) is deposited followed by backside DRIE and a hydrofluoric acid (HF) wet etch to remove the buried oxide and clear out the nanopores (FIG. 6k). This completes the entire fabrication process and releases the nanoporous membranes. FIG. 7 shows scanning electron micrographs (SEMs) of some finished devices.

Note that each mega-rib actually consists of a pair of narrow, parallel trenches (FIG. 7b) to facilitate polysilicon filling without using excessive material. This reduces the amount of Poly1 needed to obtain the same beam stiffness thereby reducing film stress, wafer curvature and the burden on subsequent etch steps. Also note that when viewed from the top, the membranes are effectively composed of an array of alternating Poly1 and Poly2 elements with nanoscale slit-pores in between (FIG. 7c). Meanwhile, the backside structural hierarchy (wafer-frame→mega-rib→mini-rib-→nanopores) can be seen in the zoom-in sequence of FIGS. 7d-f.

A backlit optical image of a 100 mm-diameter wafer with 0.8 μm-thick freestanding membranes is shown in FIG. 8a, with the wafer showing almost perfect yield. Meanwhile, the significant gain in active filter area going from Gen 1 to Gen 2 can be seen under the optical microscope (FIGS. 8b-c) in the form of larger (light-transmitting) membrane regions.

Measurements

Hydraulic porosity and burst strength measurements (see Table 1 and FIG. 9) indicate that the mega-rib membranes are at least three times more porous (efficient) than the old design while the burst pressure is five times lower, consistent with our FEA results. While the burst pressure is still acceptably above the safety threshold (5 psi), future development efforts will focus on enhancing the mega-rib design (e.g., optimizing the rib height and eliminating sharp corners and other areas of stress concentration) to further boost the mechanical robustness of the membrane without sacrificing active filter area.

TABLE 1

| Measured porosity (top) and burst pressure (bottom) for Gen 1 and Gen 2 membranes | | | |
|---|---|---|---|
| Normalized porosity (nL/s/Torr) | Type A (0.6 × 6 mm membrane) | Type B (0.8 × 6 mm membrane) | Type C (1.0 × 6 mm membrane) |
| Gen 1 | 1.29 | 1.71 | 2.94 |
| Gen 2 | 4.17 | 11.6 | 4.16 |

TABLE 1-continued

| Measured porosity (top) and burst pressure (bottom) for Gen 1 and Gen 2 membranes | | | |
|---|---|---|---|
| Burst Pressure (psi) | Type A | Type B | Type C |
| Gen 1 | 69.7 | 87.9 | 48.4 |
| Gen 2 | 13.7 | 7.74 | 5.26 |

CONCLUSION

Extending a proven rib-based design, we have developed a scalable, hierarchical rib-based MEMS fabrication approach that enables larger-span, high fill-factor nanoporous membranes with significantly higher porosity and mass-transport coefficient.

From a manufacturing perspective, this approach promises to reduce fabrication costs while preserving fabrication yield. From a design point of view, it adds flexibility by providing multiple design parameters that can be independently adjusted to optimize the balance between porosity and robustness.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

REFERENCES

[1] United States Renal Data System (USRDS), annual data report 2018.

[2] D. J. de Jager, J. J., Carrero, M. Verduijn, P. Ravani, J. de Meester, J. G. Heaf, P. Finne, A. J. Hoitsma, J. Pascual, F. Jarraya, A. V. Reisaeter, F. Collart, F. W. Dekker, K. J. Jager, "Cardiovascular and noncardiovascular mortality among patients starting dialysis," JAMA 302, 1782-9 (2009).

[3] E. O'Lone, M. Connors, P Masson, S. Wu, P. J. Kelly, D. Gillespie, D. Parker, W. Whiteley, G. F. Strippoli, S. C. Palmer, J. C. Craig, A. C. Webster, "Cognition in People With End-Stage Kidney Disease Treated With Hemodialysis: A Systematic Review and Meta-analysis," Am. J. Kidney Dis. Off. J. Natl. Kidney Found. 67, 925-935 (2016).

[4] J. D. Kopple, "Physical performance and all-cause mortality in CKD," J. Am. Soc. Nephrol. JASN 24, 689-690 (2013).

[5] M. Takasato, P. X. Er, H. S. Chiu, B. Maier, G. J. Baillie, C. Ferguson, R. G. Parton, E. J. Wolvetang, M. S. Roost, S. M. Chuva de Sousa Lopes, M. H. Little, "Kidney organoids from human iPS cells contain multiple lineages and model human nephrogenesis," Nature 536, 238 (2016).

[6] E. A. Ross, M. J. Williams, T. Hamazaki, N. Terada, W. L. Clapp, C. Adin, G. W. Ellison, M. Jorgensen, C. D. Batich, "Embryonic stem cells proliferate and differentiate when seeded into kidney scaffolds," J. Am. Soc. Nephrol. JASN 20, 2338-2347 (2009).

[7] D. B. N. Lee and M. Roberts, "A peritoneal-based automated wearable artificial kidney," Clin. Exp. Nephrol. 12, 171-180 (2008).

[8] V. Gura, A. S. Macy, M. Beizai, C. Ezon, T. A. Golper, "Technical breakthroughs in the wearable artificial kidney (WAK)," Clin. J. Am. Soc. Nephrol. CJASN 4, 1441-1448 (2009).

[9] H. D. Humes, D. A. Buffington, L. Lou, S. Abrishami, M. Wang, J. Xia, W. H. Fissell, "Cell therapy with a tissue-engineered kidney reduces the multiple-organ consequences of septic shock," Crit. Care Med. 31, 2421-2428 (2003).

[10] H. D. Humes, D. A. Buffington, S. M. MacKay, A. J. Funke, and W. F. Weitzel, "Replacement of renal function in uremic animals with a tissue-engineered kidney," Nat. Biotechnol. 17, 451-455 (1999).

[11] W. H. Fissell, and S. Roy, "The implantable artificial kidney," Semin. Dial. 22, 665-670 (2009).

[12] M. Salani, S. Roy, W. H. Fissell, "Innovations in Wearable and Implantable Artificial Kidneys," Am. J. Kidney Dis. Off. J. Natl. Kidney Found. 72, 745-751 (2018).

[13] T. A. Desai, D. J. Hansford, L. Leoni, M. Essenpreis, M. Ferrari, "Nanoporous anti-fouling silicon membranes for bio-sensor applications," Biosensors and Bioelectronics 15, 453-462 (2000).

[14] A. C. Hoogerwerf, C. Hinderling, S. Krishnamoorthy, C. Hibert, V. Spassov, T. Overstolz, "Fabrication of Reinforced Nanoporous Membranes," Proc. Transducers 2007, Lyon, France.

[15] M. Hajj-Hassan, M. C. Cheung, V. P. Chodavarapu, "Ultra-thin porous silicon membranes fabricated using dry etching," Micro & Nano Lett. 6, 226-228 (2011).

[16] A. A. Hamzah, H. E. Zainal Abidin, B. Yeop Majlis, M. Mohd Nor, A. Ismardi, G. Sugandi, T. Y. Tiong, C. F. Dee and J. Yunas, "Electrochemically deposited and etched membranes with precisely sized micropores for biological fluids microfiltration," J. Micromech Microeng. 23, 074007 (2013).

[17] S. Roy, A. Dubnisheva, A. Eldridge, A. J. Fleischman, K. G. Goldman, H. D. Humes, A. L. Zydney, W. H. Fissell, "Silicon Nanopore Membrane Technology for an Implantable Artificial Kidney," Proc. Transducers 2009, Denver, CO, USA, 2009.

[18] S. Kim, B. Feinberg, R. Kant, B. W. Chui, K. Goldman, J. Park, W. Moses, C. Blaha, Z. Iqbal, C. Chow, N. Wright, W. H. Fissell, A. Zydney, S. Roy, "Diffusive Silicon Nanopore Membranes for Hemodialysis Applications," *PLoS* 2016.

[19] B. J. Lutzenberger, D. Dickensheets, "Fabrication and modeling of rib-stiffened thin films," J. Micromech. Microeng., 19 (2009).

[20] J. Drake and H. Jerman, "A Micromachined Torsional Mirror for Track Following in Magneto-Optical Disk Drives", Proc. Hilton Head Solid-state Sensors and Actuators Workshop, 2000, S.C., USA.

[21] B. W. Chui, P. Taheri-Tehrani, N. Wright, J. Ly, S. Roy, "Ribbed Nanoporous Membranes for the Implantable Bio-artificial Kidney," Hilton Head Solid-state Sensor & Actuator Workshop, 2018, S.C., USA.

What is claimed is:

1. A filtration membrane suitable for filtering blood in vivo, the filtration membrane comprising:
   a membrane section comprising:
   a plurality of nanopores and comprising a planar first surface;
   a ribbed second surface, wherein the first surface is opposite the ribbed second surface, the ribbed second surface comprising ribs of a first height and ribs of a second height which is higher than the first height;
   the ribs of the first height defining a plurality of first windows arranged in a grid pattern, the first windows comprising the plurality of nanopores;
   the ribs of the second height defining a plurality of second windows arranged in a grid pattern, each of the plurality of second windows comprising the plurality of first windows; and
   a support section forming a third window comprising the plurality of second windows, wherein the support section is attached to the ribbed second surface of the membrane section at a periphery of the membrane section and has a third height higher than the ribs of the second height,
   wherein the surface area of the ribbed second surface of the membrane enclosed by the third window is in the range of 0.1 mm$^2$-10 mm$^2$.

2. The filtration device of claim 1, wherein the membrane section is formed from polysilicon, silicon, silicon nitride, silicon carbide, graphene, or diamond, or a combination thereof.

3. The filtration device of claim 1, wherein the support section comprises a silicon wafer.

4. The filtration device of claim 1, wherein the plurality of nanopores have a depth of about 1 μm or 0.8 μm-10 nm, or 0.8 μm-500 nm.

5. The filtration device of claim 1, wherein the surface area of the second surface of the membrane enclosed by the third window is in the range of 1 mm$^2$-10 mm$^2$, 2 mm$^2$-8 mm$^2$ or 3 mm$^2$-6 mm$^2$.

6. The filtration device of claim 1, wherein the third window is substantially rectangular in shape, comprising a length of 2000 μm-5000 μm and a width of 500 μm-1000 μm.

7. The filtration device of claim 1, wherein the third height is in the range of 500 μm-200 μm or 500 μm-300 μm.

8. The filtration device of claim 1, wherein the support section has a thickness of about 20 μm-50 μm or 30 μm-50 μm.

9. The filtration device of claim 1, wherein the ribs of the second height range in height from 20 μm-50 μm or 30 μm-50 μm and in thickness from 20 μm-5 μm or 15 μm-5 μm.

10. The filtration device of claim 1, wherein the ribs of the first height range in height from 2 μm-10 μm, 3 μm-8 μm, or 3 μm-6 μm and in thickness from 0.5 μm-5 μm or 1 μm-2.5 μm.

11. The filtration device of claim 1, wherein the plurality of second windows comprise 50-100 second windows.

12. The filtration device of claim 1, wherein the plurality of first windows comprise 50-20 first windows.

13. The filtration device of claim 1, wherein the plurality of nanopores are slit shaped nanopores, comprising:
   a length of up to 3 μm and a width of up to 0.1 μm; or
   a length up to 2 μm and a width of up to 50 nm; or
   a length of 1 μm-3 μm and a width of 10 nm-100 nm.

14. The filtration device of claim 1, wherein the nanopores are not present in regions of the membrane section that extend to form ribs and/or are covered by the support section.

15. The filtration device of claim 1, wherein the membrane section and support section are connected via an intermediate layer.

16. The filtration device of claim 1, comprising a plurality of the filtration units arranged in a side-by-side configuration.

* * * * *